United States Patent
Corsaro et al.

[11] Patent Number: 5,104,166
[45] Date of Patent: Apr. 14, 1992

[54] TURNING AND LIFTING DEVICE

[76] Inventors: Luigi Corsaro, 5 Webster Pl., Edison, N.J. 08817; Vincent Ferrante, 2 Boxwood Ct., Edison, N.J. 08820

[21] Appl. No.: 604,198

[22] Filed: Oct. 29, 1990

[51] Int. Cl.$^5$ ............................................. A47J 43/28
[52] U.S. Cl. ............................................. 294/8; 294/32
[58] Field of Search ............... 294/7, 8, 19.1, 26.5, 294/32, 49, 51, 53.5, 57, 59; 30/319, 324, 500, DIG.1; 37/189; 99/394, 395, 397, 409, 421 A; 172/41

[56] References Cited

U.S. PATENT DOCUMENTS

| | | | |
|---|---|---|---|
| 270,277 | 1/1883 | Brookes | 294/8 X |
| 614,016 | 11/1898 | Macduffee | 294/8 |
| 725,628 | 4/1903 | Ressler | 294/7 |
| 1,274,927 | 8/1918 | Moon | 294/49 X |
| 1,575,275 | 3/1926 | Pearson | 294/8 |
| 2,279,324 | 4/1942 | Julien | 294/57 |
| 2,621,957 | 12/1952 | Hartrampf | 294/8 |
| 3,077,664 | 2/1963 | Murawski | 30/DIG. 1 X |
| 4,095,832 | 6/1978 | Slinker | 294/8 |
| 4,249,313 | 2/1981 | Bates | 30/DIG. 1 X |

*Primary Examiner*—Johnny D. Cherry
*Attorney, Agent, or Firm*—Ezra Sutton

[57] ABSTRACT

A device for lifting and turning food articles while cooking in an oven, such as pizzas, which includes a flat plate for holding the food article, an elongated handle, a drive shaft in the handle, a gear to rotate the plate, and a motor for rotating the drive shaft and gear to rotate the plate and food article.

4 Claims, 3 Drawing Sheets

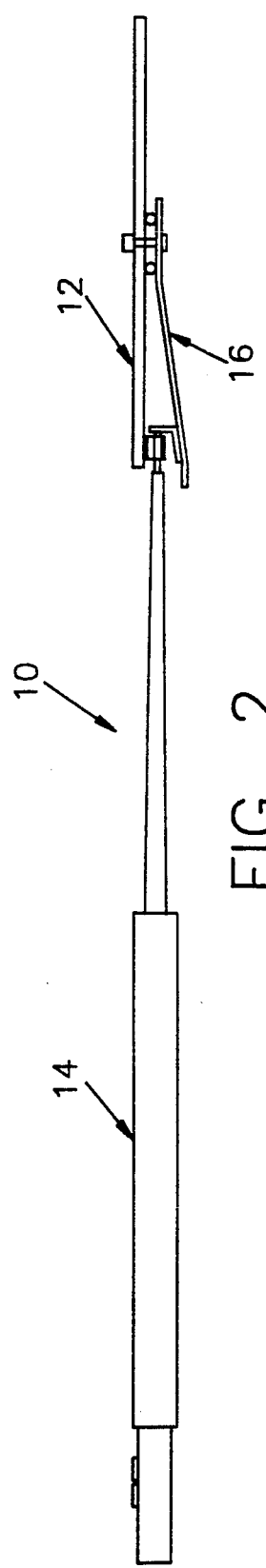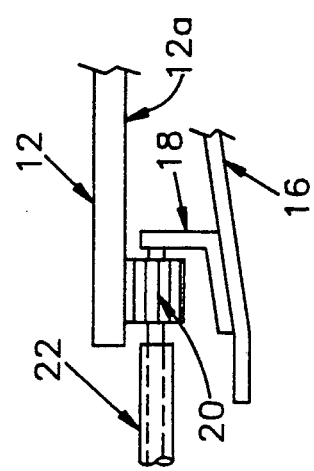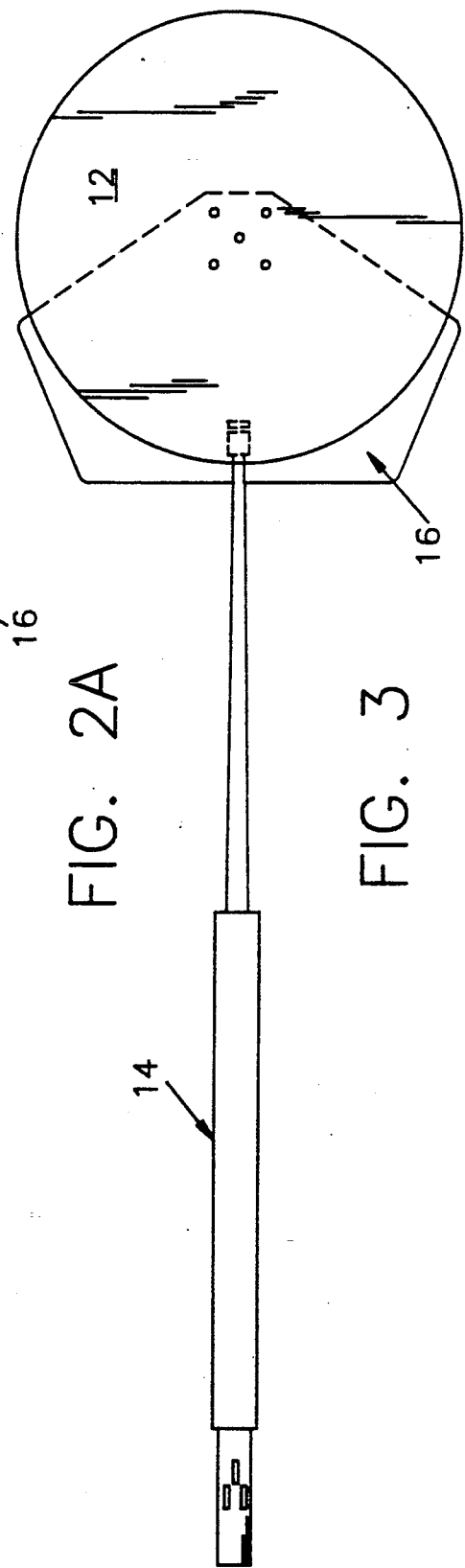

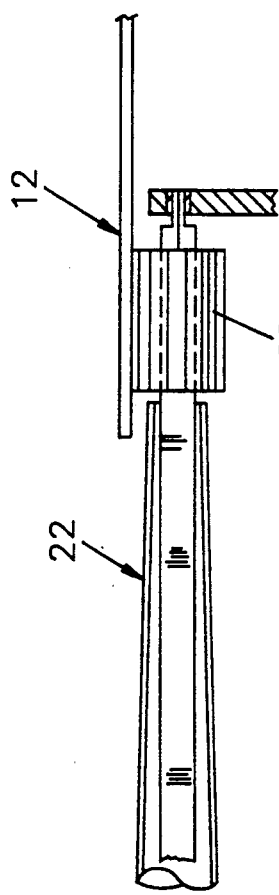
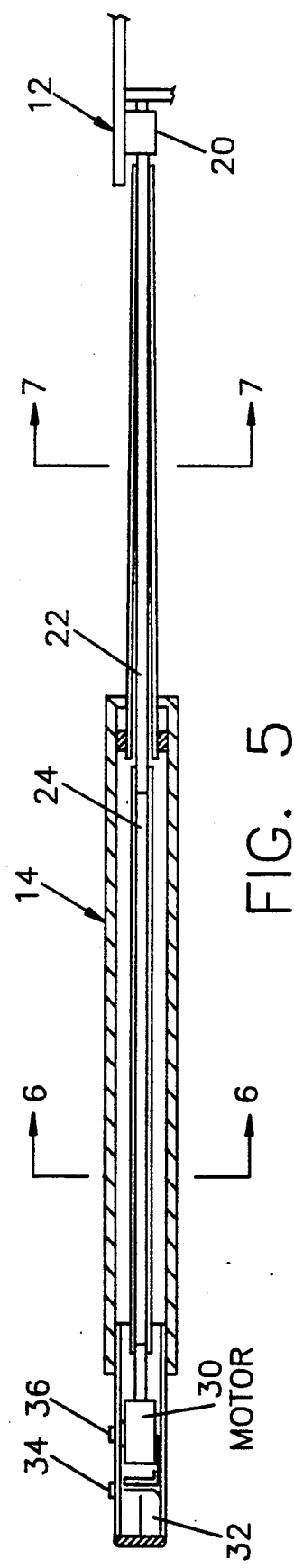
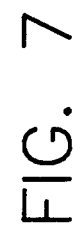
FIG. 4
FIG. 5
FIG. 6
FIG. 7

TURNING AND LIFTING DEVICE

FIELD OF THE INVENTION

The present invention relates to a device for lifting and turning an article, such as a pizza, while it is being baked in an oven.

BACKGROUND OF THE INVENTION

The prior art fails to disclose a simple and efficient device for lifting and turning food articles, and it is an object of the present invention to provide such a device.

SUMMARY OF THE INVENTION

In accordance with the present invention, there is provided a device for lifting and turning food articles, which includes a flat plate for holding an article, an elongated handle connected to the plate, a drive shaft disposed in the handle, a gear connected to the drive shaft for directly engaging the bottom of the plate to rotate the plate, and a motor disposed in the handle for rotating the drive shaft and the gear to engage and rotate the plate, so that the article on the plate turns.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein:

FIG. 2 is a side elevational view;
FIG. 2A is a detailed view of the gear drive;
FIG. 3 is a top plan view;
FIG. 4 is a detailed view of the gear drive;
FIG. 5 is a cross-sectional view of the telescoping handle and drive shaft;
FIG. 6 is a sectional view of FIG. 5; and;
FIG. 7 is a sectional view of FIG. 5.

DETAILED DESCRIPTION OF THE PREFERRED EMBODIMENT

Figure 1:
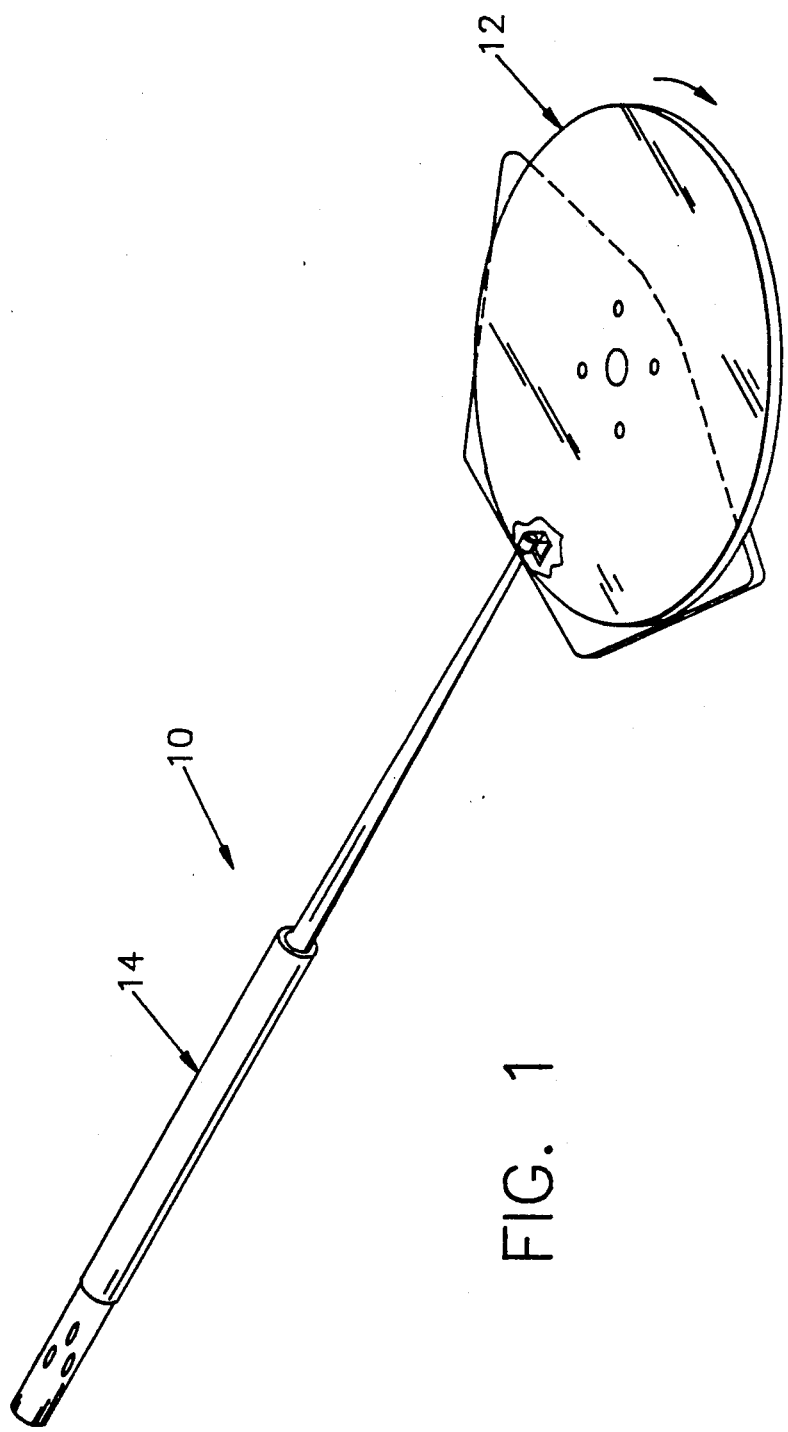
FIG. 1 is a perspective view of the present invention.

In FIG. 1, there is shown the device 10 of the present invention, which includes a flat, circular plate 12 for holding an article, such as a pizza, and an elongated handle 14 connected to plate 12. Plate 12 is made of stainless steel and preferably is round. As shown in FIG. 2, a member 16 is connected to and supports plate 12. Bracket 18 supports a gear 20, which is disposed on the end of a drive shaft 22. Gear 20 directly engages the bottom 12a of plate 12 to rotate plate 12 without slipping.

Shaft 22 telescopes into shaft 24, so that handle 14 may be reduced in length. Shaft 24 is connected to and is driven by a motor 30 mounted within handle 14. Motor 30 is powered by a rechargeable battery 32 also disposed in the handle. Push buttons 34 and 36 are provided for turning motor 30 on and off.

The device 10 may be used for lifting and turning articles, such as a pizza, while it is being baked in an oven. The plate 12 is slid under the pizza, and the push button 34 is actuated to turn on motor 30. As a result, shafts 22 and 24 drive gear 20 so that it rotates. Gear 20 engages the bottom of plate 12 and rotates the plate 12 and the pizza thereon which is being baked.

Advantageously, there has been provided an improved device for lifting and turning food articles.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A device for lifting and turning an article, comprising:
   a) a flat plate for holding an article;
   b) an elongated handle connected to said flat plate;
   c) a drive shaft disposed in said handle;
   d) gear means connected to said drive shaft for directly engaging the bottom of said plate to rotate said plate;
   e) a motor disposed in said handle for rotating said drive shaft and said gear means for rotating said plate to turn said article on said plate; and
   f) a support member attached to the underside of said plate and supporting said gear means for directly engaging the bottom of said plate.

2. A device in accordance with claim 1, wherein said handle telescopes to reduce its size.

3. A device in accordance with claim 1, further including a push button for actuating said motor.

4. A device in accordance with claim 3, further including a battery connected to said motor.

* * * * *